March 6, 1934.  A. KLOS  1,950,055

SOLE AND HEEL TRIMMING ATTACHMENT

Filed Dec. 14, 1932  2 Sheets-Sheet 1

March 6, 1934. A. KLOS 1,950,055
SOLE AND HEEL TRIMMING ATTACHMENT
Filed Dec. 14, 1932 2 Sheets-Sheet 2
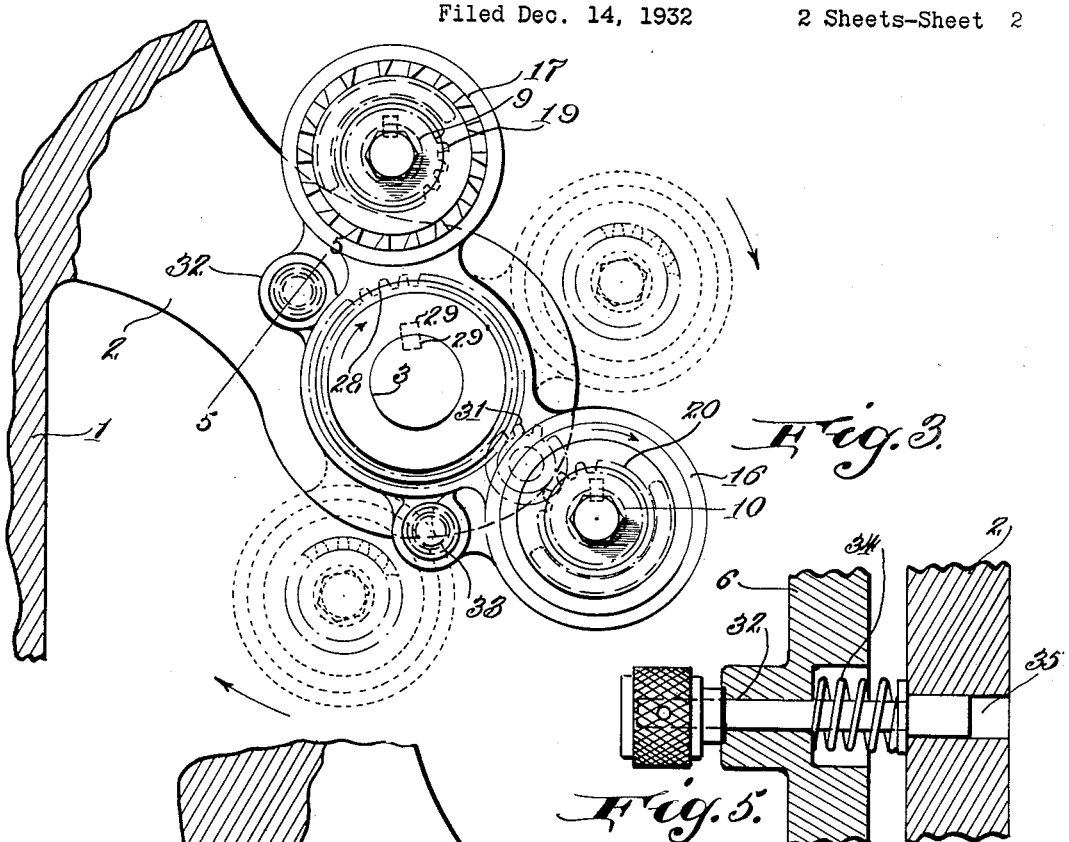
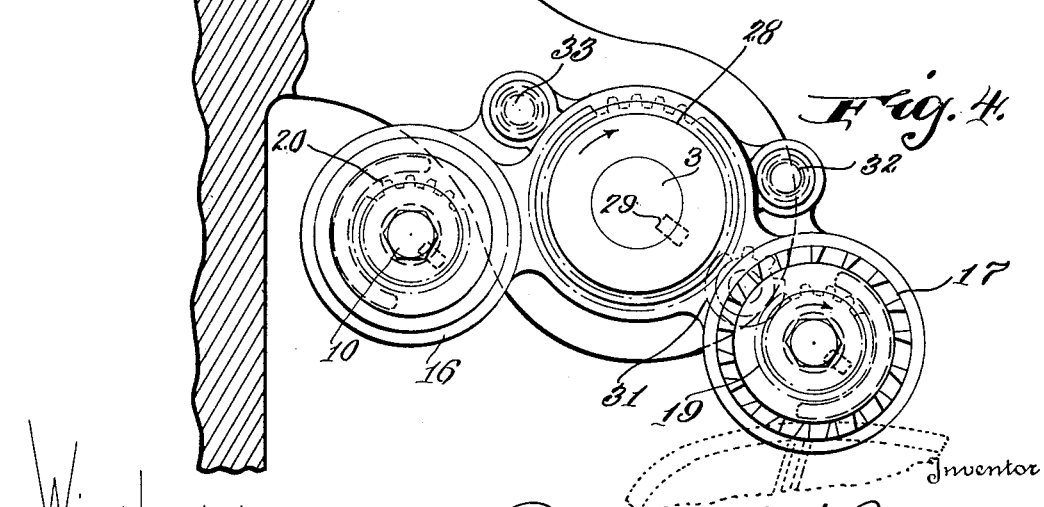
Inventor
Adam Klos
By Edwin Hannuels
Attorney Patented Mar. 6, 1934

1,950,055

UNITED STATES PATENT OFFICE 1,950,055

SOLE AND HEEL TRIMMING ATTACHMENT

Adam Klos, Baltimore, Md.

Application December 14, 1932, Serial No. 647,194

6 Claims. (Cl. 12—89)

The practice followed in power equipped shoe repair shops whereby the work is finished on a long machine which generally extends the whole length of the shop, being provided with a number of different sandpaper wheels, buffers and brushes, mounted on a single longitudinal shaft on which they are arranged in the order in which they are used, is quite generally familiar and well understood.

In such shops trimming of the heels and soles is performed either by hand or on a separate machine which is more or less elaborate and expensive. It has not been feasible to mount the trimming cutters on the regular type of buffing machine on account of the increased speed of the cutter which is necessary to the trimming operation as compared to the proper speed of the buffers and brushes.

In this connection it should be understood that in cutting leather by means of a rotary cutter there is a definite linear speed of the cutter blades which is essential to satisfactory results in cutting leather as there is likewise a suitable and different cutting speed in woodworking and still another different speed which is suitable for cutting each and every different kind of metal.

Another reason for the failure to provide trimming equipment in connection with the various buffers is that there has been no convenient method of mounting the trimming wheels on the buffer so that the buffing wheels can be operated and utilized without interfering with the trimmer and so that the respective trimming wheels can be utilized without interference with the buffing apparatus, and so that the different trimming wheels and finishing wheels can be used without bringing the work in contact with the trimmers or finishing wheels not in use.

The object of the invention is to provide a trimming attachment which can be applied almost instantaneously to the main shaft of a finishing or buffing machine, and operated thereby, the attachment including a train of gearing whereby the trimming cutters can be driven from the shaft of the finishing machine at a suitable speed and a bracket on which the trimming wheels are mounted in connection with a train of planetary gearing so that the respective trimming wheels can be rocked within a suitable arc about the shaft bringing each trimmer in turn into driving relation with the gear train and at the same time into operative position in which the trimmer which it is desired to use is available and accessible for the trimming of heels or soles as the case may be.

The improved apparatus also includes in the preferred form a plurality of locking stops by means by which the rocking support is positively and instantaneously locked in its respective predetermined operative positions. The trimming attachment also includes suitable shields and work guides moving with the cutters whereby injury to the operator and/or undesired contact of the work with the gears and cutters is prevented and the work is guided in operative relation to the trimming cutters.

In the accompanying drawings I have illustrated a shoe trimming attachment for a shoe buffing machine embodying the features of my invention in the preferred form.

In the drawings:

Figure 3 is a side elevation looking from the extreme left toward the right in Figure 1 showing one trimming wheel in its operative position and the other in the withdrawn position, the trimmer wheels in intermediate position being indicated in dotted lines.

Figure 4 is a corresponding view showing the other trimming wheel in operative position, the one first shown in operative position being withdrawn.

Figure 5 is a fragmentary section on the line 5, 5 in Figure 3, showing the details of one of the stops or bolts.

Figure 1:
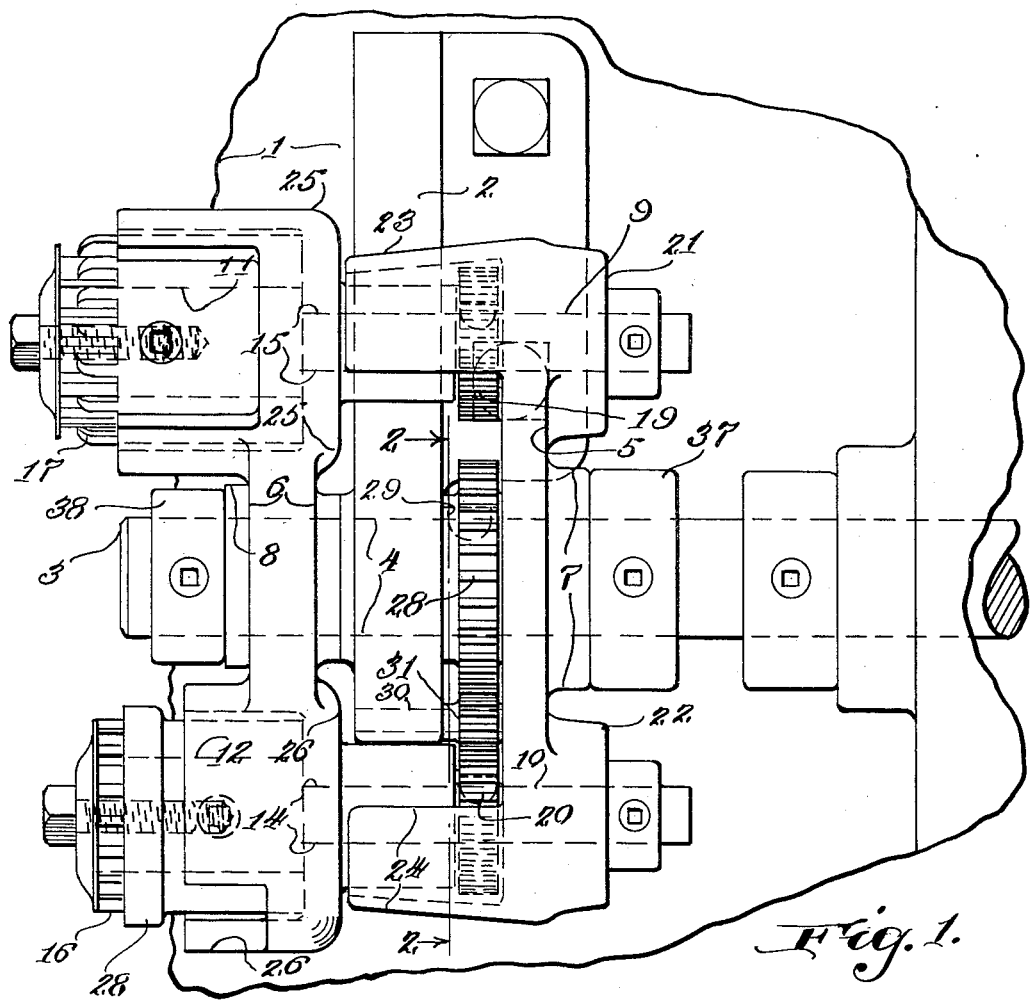
Figure 1 is a front elevation of the shoe trimming attachment of the invention mounted on a buffing machine, the buffing machine being shown fragmentarily.
Figure 2:
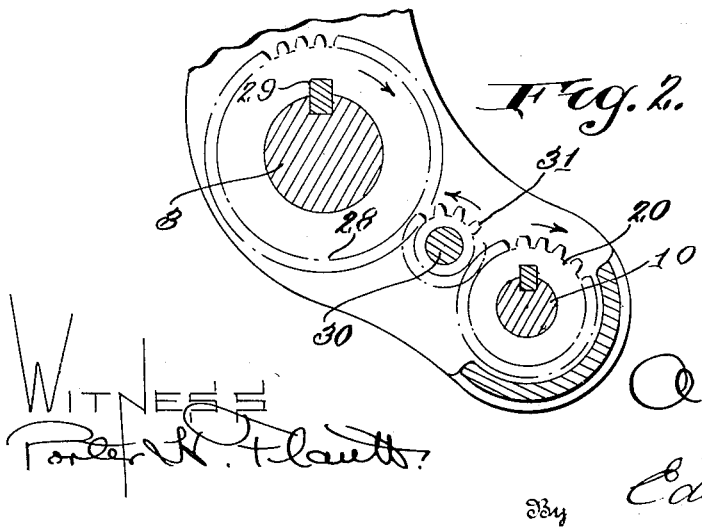
Figure 2 is a sectional elevation on the line 2, 2 of Figure 1 looking to the right and showing the planetary gearing.

Referring to the drawings by numerals, each of which is used to indicate the same or similar parts in the different figures, a buffing machine frame 1 is shown fragmentarily. A bracket 2 which is part of applicant's attachment, is attached to the machine frame 1. This bracket is apertured to pass the main shaft 3, being shown as having a suitable bearing 4 for this purpose. The attachment comprises, in addition to the bracket 2, a plurality of pivotally mounted rocking bracket arms 5, and 6, respectively, which operate as a single rocker arm. Each of these bracket arms 5, 6 is pivoted on the shaft 3 which extends through suitable bosses 7 and 8 at or near the center of the respective brackets 5 and 6, and each bracket arm is provided with suitable bearings. The bearings in the bracket 5 are numbered 9 and 10 and those in bracket 6 are numbered 11 and 12. The cutter shafts 14 and 15 are carried in these bearings.

The bearings 9 and 11 (Fig. 1) are in the operative positions of the brackets 7 and 8 arranged in axial alignment with each other and the bearings 10 and 12 at the opposite ends of the brackets 5 and 6 are also in alignment. The respective aligned pairs of bearings 9, 11 and 10, 12 are in the preferred form of the invention separated by an arc of approximately 120 degrees about the center of shaft 3. This provides for a convenient spacing of the cutters so that each in turn can be brought into operative position as shown in Figures 3 and 4, the other cutter being at the time in its extreme position remote from the point of operation.

The aligned bearings 9 and 11 carry the sole trimmer shaft 15 on which is mounted the heel trimmer 17 suitably secured, and the aligned bearings 10 and 12 carry the heel trimmer shaft 14 on which is mounted the sole trimmer or sole trimming cutter 16. The sole trimmer shaft 15 carries a drive gear 19 referred to herein as a planetary gear suitably secured to the shaft and the heel trimmer shaft 14 carries a drive gear 20, also referred to as a planetary gear, likewise suitably secured. The term planetary is used because these gears swing to and from operative position with this shaft as the rocker arm rocks.

The bracket arm 5 is shown as provided with a boss 21 surrounding the bearings 9 and a suitably curved guard 23 projecting oppositely to the boss 21 and serving as an enclosure and protection for the planetary gear 19 to prevent contact of the operator or the work therewith. The bracket 5 is also provided at its opposite end with a boss 22, surrounding the bearing 10 and a curved guard 24 projecting from the bracket oppositely thereto and partially enclosing and projecting the pinion 20 to prevent contact therewith of the work or the operator.

The bracket 6 is provided with suitable bosses 26 surrounding the bearing 12 and apportioned to partially enclose the heel trimmer 16. A guard 28 secured to trimmer 16 also serves as a guide for the work. This bracket 6 is also provided at its opposite end with a boss 25 apportioned to partially enclose the cutter forming a guard which also serves as a guide for the work.

The attachment includes in addition to the cutters and their shafts and the planetary gears therefor and the adjustable supporting brackets forming a rocker arm, a drive gear 28 which is preferably positioned between the bracket arm 5 and the shaft bracket 2 and mounted on the main shaft 3 to which it is secured in any suitable manner as by means of a key 29, see Figure 3. Meshing with this gear at all times being preferably mounted on a stud 30, seated in the bracket 2 beyond the shaft 3 is the drive pinion 31 with which the respective planetary gears 19 and 20 mesh alternatively in the respective operative positions of the attachment. This pinion 31 meshes at all times with drive gear 28.

In order that the respective heel and sole trimmers 16 and 17 and their planetary drive gears 19 and 20, and the rocker arm which carries them may be held and secured at the will of the operator in their respective alternative operative positions, the rocking cutter bracket 6 is provided with two sliding spring bolts or stops 32 and 33, respectively.

These bolts are controlled by springs 34 in any suitable manner and are arranged to operate at right angles to the plane of swing. The latches or stop bolts 32 and 33 are positioned to correspond to the spacing of the cutters and are adapted to enter and engage a suitable aperture 35 in the bracket 2, each of said bolts 32 and 33 engaging the aperture 35 in turn in the operative position of the opposite cutter, it being noted that in the preferred form of the device shown the cutter 19 is directly opposite the bolt 33 and the cutter 20 is directly opposite the bolt 32, though this exact relation of the parts is not regarded as essential.

The shaft bracket 2 would under ordinary circumstances be separate and removable from the free end of the buffer shaft 3 and may to advantage be assembled with the attachment thus contributing to the ease and quickness with which the attachment is applied. Thus arranged, the trimmer is almost instantaneously applied, and it is important to note that it requires no motor or belt. The shaft 3 would ordinarily be provided with a keyway 29'. If not, such a keyway is easily cut. In this connection it will be noted that the brackets 5 and 6, forming the rocker arm are on opposite sides of the stationary bracket 2, and the gear 28 is preferably adjacent the bracket 2 between the rocker bracket member 5 and supporting bracket 2 so that the workman is completely protected from contact with it. To assemble the attachment on and with the buffer, it is, under the circumstances, only necessary to pass the bracket arm 5, the gear 28, the bracket 2 and the bracket arm 6 with the collars 37 and 38 over and on to the shaft 3 and secure the gear 28 in position, likewise, the collars 37 and 38 which position the attachment. The attachment is thus made ready for operation and may be used as a sole trimmer by swinging the bracket arms 5 and 6, both of them together constituting the rocker arm, until the planetary gear 19 meshes with the pinion 13, the sole trimming cutter 17 being thus brought into operative position as shown in Figure 4. The bolt 33 being automatically inserted in the opening 35 by the operation of the spring 34, locks the parts in the operative position of the cutter 17, which is driven by the train of gears 28, 31, 19.

When it is desired to utilize the heel trimmer 16, the bolt 33 is withdrawn and the brackets with the cutters carried thereby with the planetary gears are rotated upwardly to the position shown in Figure 3 in which the bolt 32 enters the aperture 35 locking the heel trimmer in its operative position with planetary gear 20 in mesh with pinion 31.

It will be observed that in operative position of either the cutter 16 or 17 the cutters and the gears are completely shielded from contact with the operator and all of the parts are so protected and spaced as to prevent at all times any undesired or unintended contact of the work with the cutters or the gears which latter are guarded and protected by the shields 23 and 24, and by the brackets 2, 6 and 7, which are so shaped, arranged and spaced as to shield the gears and prevent contact of the work therewith.

It will be understood that the bracket 2 may be either a part of the buffing machine or of the attachment. But it is of particular interest that the trimmer as described requires no motor or belts and is instantaneously applied to the buffer shaft and is at all times available for immediate operation of either cutter.

I have thus described specifically and in detail a sole and heel trimmer embodying the features of the invention in the preferred form in

What I claim as new and desire to secure by Letters Patent is:

1. A sole and heel trimming attachment for buffing machines, comprising a rocker having a bearing engaging the main shaft of the buffing machine, spaced cutter shaft bearings carried by said rocker, cutter shafts carried by said bearings, sole and heel trimming cutters mounted on said shafts, respectively, at the side of the rocker arm to move with the rocker into and out of operative position alternatively, a planetary gear on each shaft and a drive gear mounted on the main shaft, a pinion meshing with the drive gear mounted on the attachment in a position to engage and to drive the planetary gear of each cutter, respectively, when said rocker is moved to operative position.

2. A sole and heel trimming attachment for buffing machines, comprising a rocker having a bearing engaging the main shaft of the buffing machine, cutter shaft bearings carried by said rocker, said bearings being spaced on an arc about said main shaft, parallel cutter shafts carried by said bearings, sole and heel trimming cutters mounted on said shafts at the side of the rocker, a planetary gear on each shaft and a drive gear mounted on the main shaft, a pinion mounted on the attachment in a position to engage and drive the planetary gear of each cutter, respectively, when the rocker is moved to operative position, said pinion being driven by said main shaft.

3. A sole and heel trimming attachment for buffing machines, comprising a rocker mounted to rock about the main shaft of the buffing machine, cutter shaft bearings carried by said rocker arm, said bearings being spaced apart on an arc about said main shaft, cutter shafts carried by said bearings, sole and heel trimming cutters mounted on said shafts on one side of the rocker, a planetary gear on each shaft and a drive gear mounted on the main shaft, a pinion mounted on the attachment in a position to be driven by said drive gear and engage and drive the planetary gear of each cutter, respectively, when the rocker is moved to operative position, the said rocker being formed in two parts providing a planetary gear guard and a cutter guard for each planetary gear, and each cutter, said parts being on opposite sides of the driving gear.

4. A sole and heel trimming attachment for buffing machines, comprising a rocker mounted to oscillate about a rotary shaft of the buffing machine, cutter shaft bearings carried by said rocker and spaced about the rotating shaft, cutter shafts carried by said bearings, sole and heel trimming cutters mounted on said shafts, a planetary gear on each shaft and a drive gear mounted on the rotary shaft, a pinion mounted in a position to be driven by said rotary shaft and to engage and drive the planetary gear of each rocker, respectively, when the cutter is moved to operative position.

5. A sole and heel trimming attachment for buffing machines, comprising a rocker mounted to rock about a rotary shaft of the buffing machine, cutter shaft bearings mounted on said rocker and spaced about said shaft, cutter shafts carried by said bearings, sole and heel trimming cutters mounted on said shafts on one side of the rocker, a planetary gear on each shaft and a drive gear mounted on the rotary shaft, a pinion mounted on the attachment in a position to be driven by said driving gear to engage and drive the planetary gear of each cutter, respectively, when said bracket is moved to operative position, the said rocker arm being formed in two parts, and a supporting bracket between said two parts of the rocker, the drive gear being on one side of the bracket between it and one said part of the rocker.

6. A sole and heel trimming attachment for buffing machines, comprising a rocking bracket mounted to rock about a rotary shaft of the buffing machine, cutter shaft bearings carried by said rocking bracket and spaced about said rotary shaft, cutter shafts carried by said bearings, sole and heel trimming cutters mounted on said shafts, a planetary gear on each shaft and a drive gear mounted on the said rotary shaft, a pinion mounted on the attachment in a position to engage and drive the planetary gear of each cutter, respectively, when the rocking bracket is moved to operative position, means for driving said pinion, and an automatic lock for positioning and holding the bracket in the respective operative positions of the cutters with the corresponding planetary gear in mesh with the pinion.

ADAM KLOS.